UNITED STATES PATENT OFFICE.

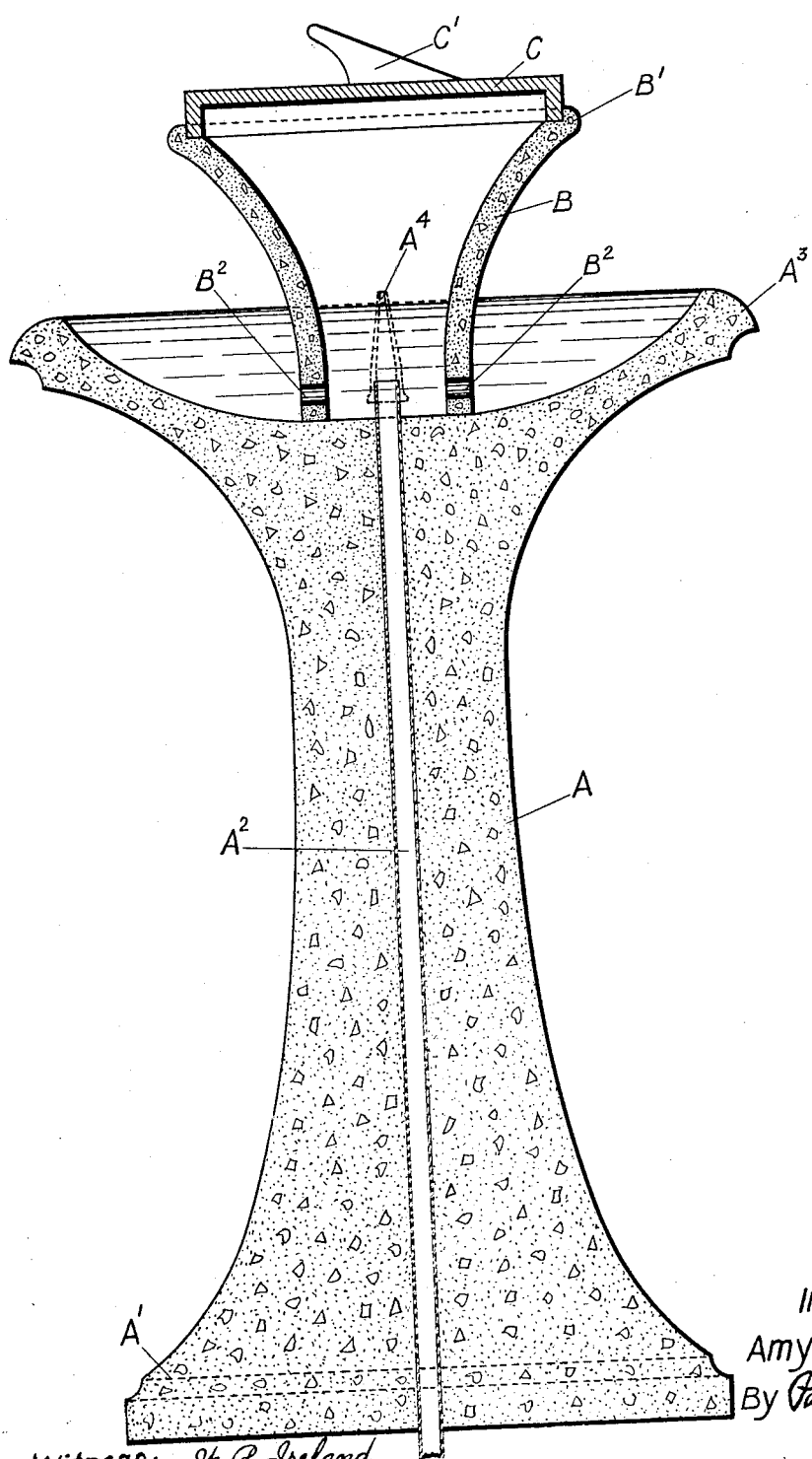

AMY H. LEVERETT, OF ALTON, ILLINOIS.

BIRD-BATH.

1,354,113.  Specification of Letters Patent.  Patented Sept. 28, 1920.

Application filed August 16, 1919. Serial No. 317,933.

*To all whom it may concern:*

Be it known that I, AMY H. LEVERETT, a citizen of the United States, residing at Alton, in the State of Illinois, have invented a certain new and useful Improvement in Bird-Baths, of which the following is a specification.

My invention relates to bird baths and particularly to a bird bath in combination with a fountain or a sun dial. The arrangement is such that the sun dial is placed over the fountain and therefore stops its operation, and when the sun dial is not in place the fountain is free to play. A variety of other objects, such as ornaments or food trays, might take the place of the sun dial but any of them would serve to mask the fountain in some manner.

My invention is illustrated more or less diagrammatically in the accompanying drawing, which is a vertical section.

A is the main pedestal having a broad base $A^1$ and the water supply pipe $A^2$. $A^3$ is a basin at the top of the pedestal. $A^4$ is a nozzle on the water supply pipe. B is an open cylindrical chamber enlarged at its upper end as at $B^1$ and provided about its bottom with a plurality of radial perforations $B^2$, $B^2$. This chamber may be made integral with the pedestal or may be secured to it or may be merely placed upon it and held in position by its own weight. C is a plate adapted to rest upon the upper end of the chamber $B^1$. It may carry a sun dial $C^1$ or any other ornament or may be made in the shape of a dish or tray to receive food.

It will be evident that while I have shown in my drawing an operative device still many changes might be made both in size, shape and arrangement of parts without departing materially from the spirit of my invention and I wish therefore that my drawings be regarded as in a sense diagrammatic.

The use and operation of my invention are as follows:

When the water is turned into the water supply pipe it will normally be forced upward through the nozzle and out through the open chamber in the form of a jet and my device will then act as a fountain. I may provide about the entire structure an additional overflow basin on the ground, which may be filled with aquatic plants or used for any other desirable purpose.

When it is no longer desirable to have the fountain playing, the plate which carries the sun dial or other ornament is placed across the top of the open chamber and its weight is such that the jet of water is not sufficiently powerful to dislodge it. The water will, therefore, flow out through the perforations about the lower end of the chamber and will fill the basin. While I have shown a plate as extending entirely across the upper end of the chamber, it might equally well be made in the form of a float which would extend into the chamber and would have the same effect.

I claim:—

1. In a bird bath the combination of an open chamber, the sides whereof are perforated, with a fountain adapted to deliver within and play through said chamber and means for supplying water to said fountain, and a cover for said chamber adapted to obstruct the play of said fountain.

2. In a bird bath the combination of an open chamber, the sides whereof are perforated, with a fountain adapted to deliver within and play through said chamber and means for supplying water to said fountain, and a cover for said chamber adapted to obstruct the play of said fountain, and to cause water to discharge through the perforations of said chamber.

3. In a bird bath the combination of an open chamber, the sides whereof are perforated adjacent its lower edge, with a fountain adapted to deliver within and play through said chamber and means for supplying water to said fountain, and a cover for said chamber adapted to obstruct the play of said fountain, and to cause water to discharge through the perforations of said chamber.

4. In a bird bath the combination of an open chamber, the sides whereof are perforated adjacent its lower edge, with a fountain adapted to deliver within and play through said chamber and means for supplying water to said fountain, and a cover for said chamber adapted to obstruct the play of said fountain, and to cause water to discharge through the perforations of said chamber, said cover adapted to carry an ornament.

In testimony whereof, I affix my signature in the presence of two witnesses this eleventh day of August, 1919.

AMY H. LEVERETT.

Witnesses:
ELISE L. OWEN,
IRIS N. EYER.